Feb. 22, 1938.  E. G. YOUNG  2,109,124
DOUGH PRESSING MACHINE
Filed April 23, 1937   4 Sheets-Sheet 2

Inventor.
E. G. Young
By Clarence A. O'Brien
Hyman Berman
Attorneys

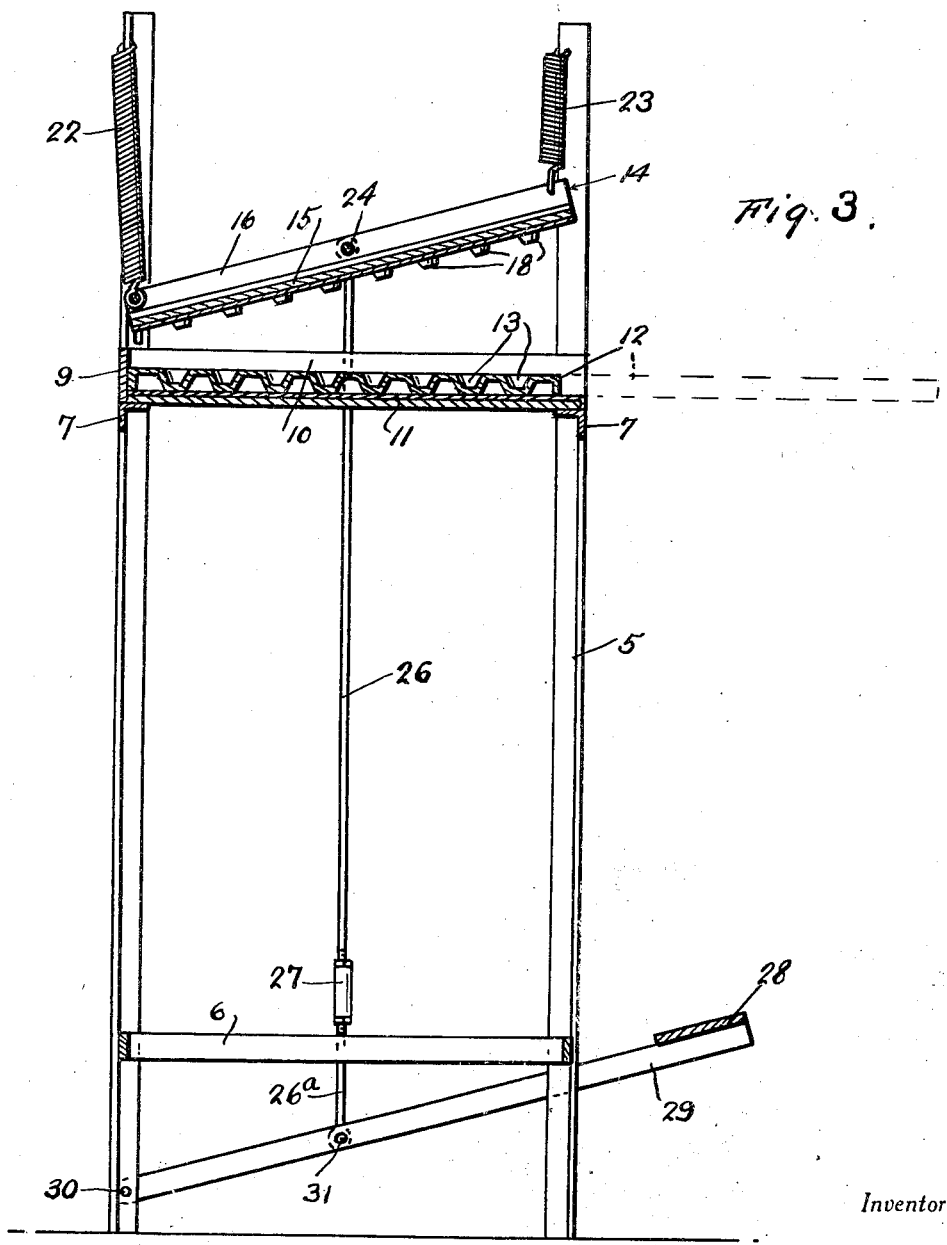

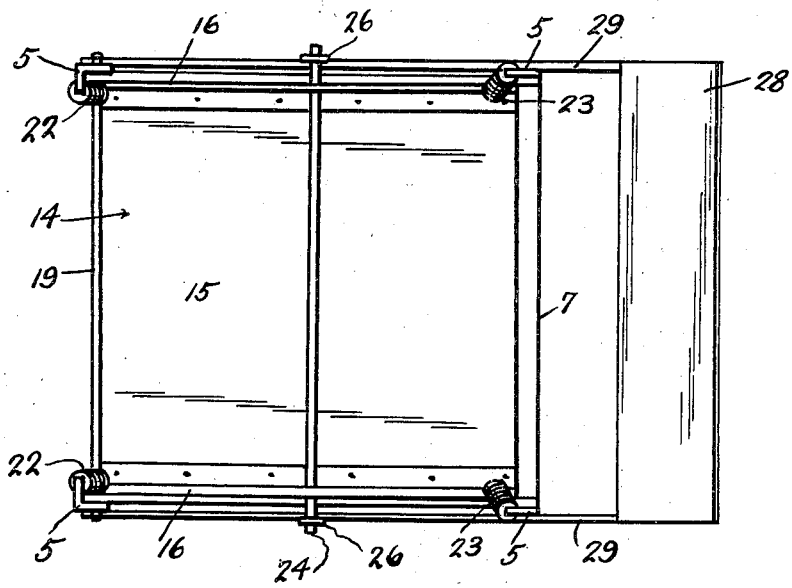
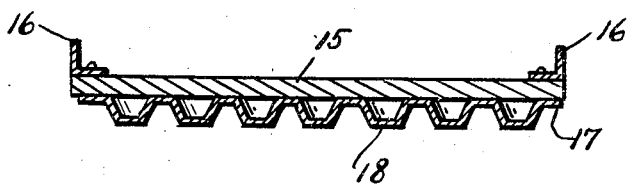
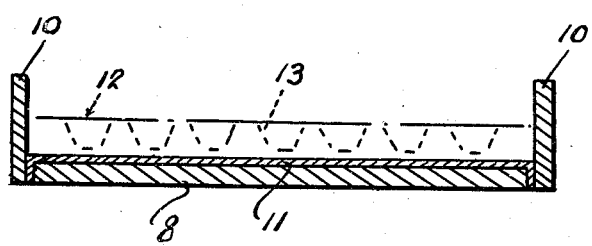

Patented Feb. 22, 1938

2,109,124

UNITED STATES PATENT OFFICE 2,109,124

DOUGH PRESSING MACHINE

Essel G. Young, Detroit, Mich.

Application April 23, 1937, Serial No. 138,653

4 Claims. (Cl. 107—15)

This invention relates to a machine for use in the making of bakery products, and particularly to machines for shaping and treating dough preparatory to baking; and the invention, together with its objects and advantages, will be best understood from a study of the following description taken in connection with the accompanying drawings, wherein:

Figure 3 is a vertical sectional view through the pressing machine.

Figure 4 is a top plan view of the pressing machine.

Figure 5 is a transverse sectional view through a presser member, and

Figure 6 is a transverse sectional view through a supporting bed forming part of the pressing machine.

Figure 1:
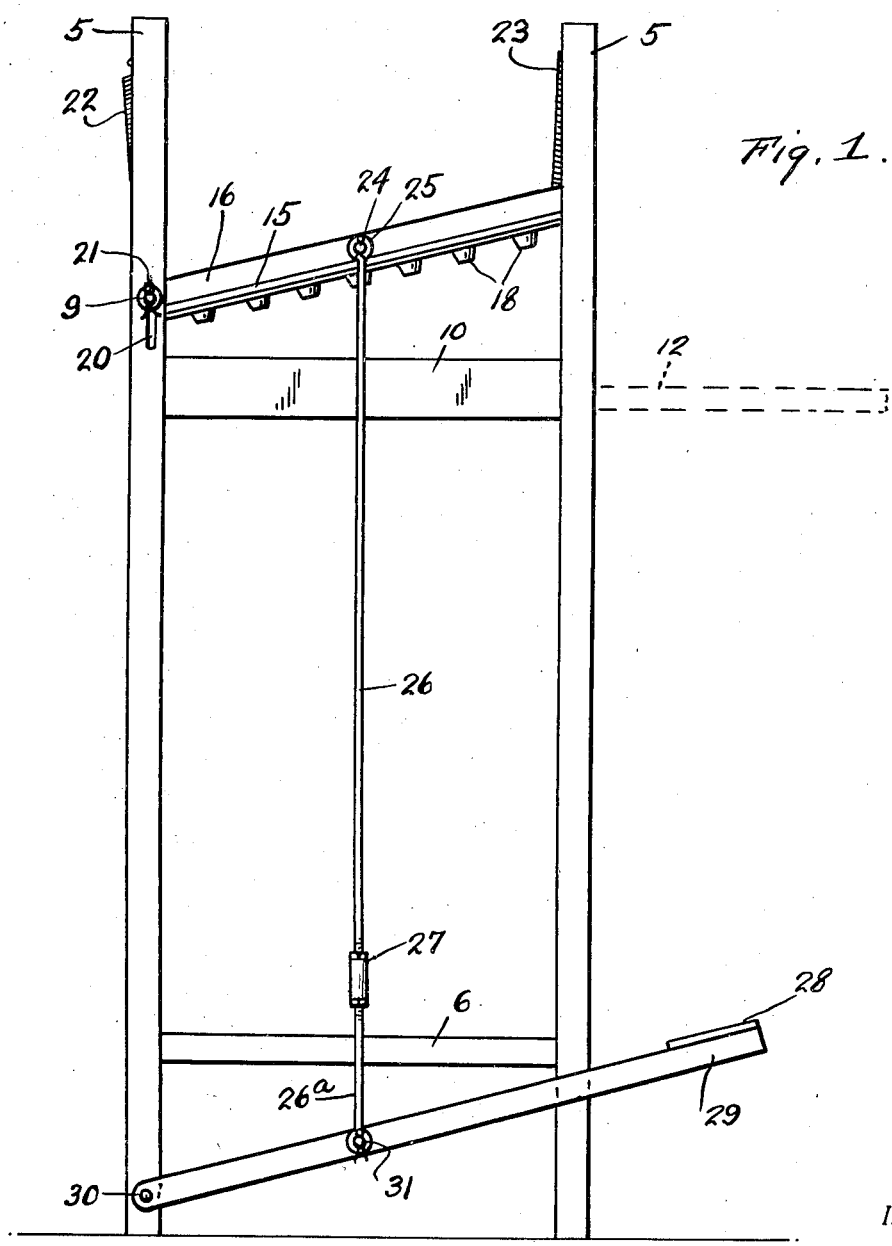
Figure 1 is a side elevational view of the pressing machine.
Figure 2:
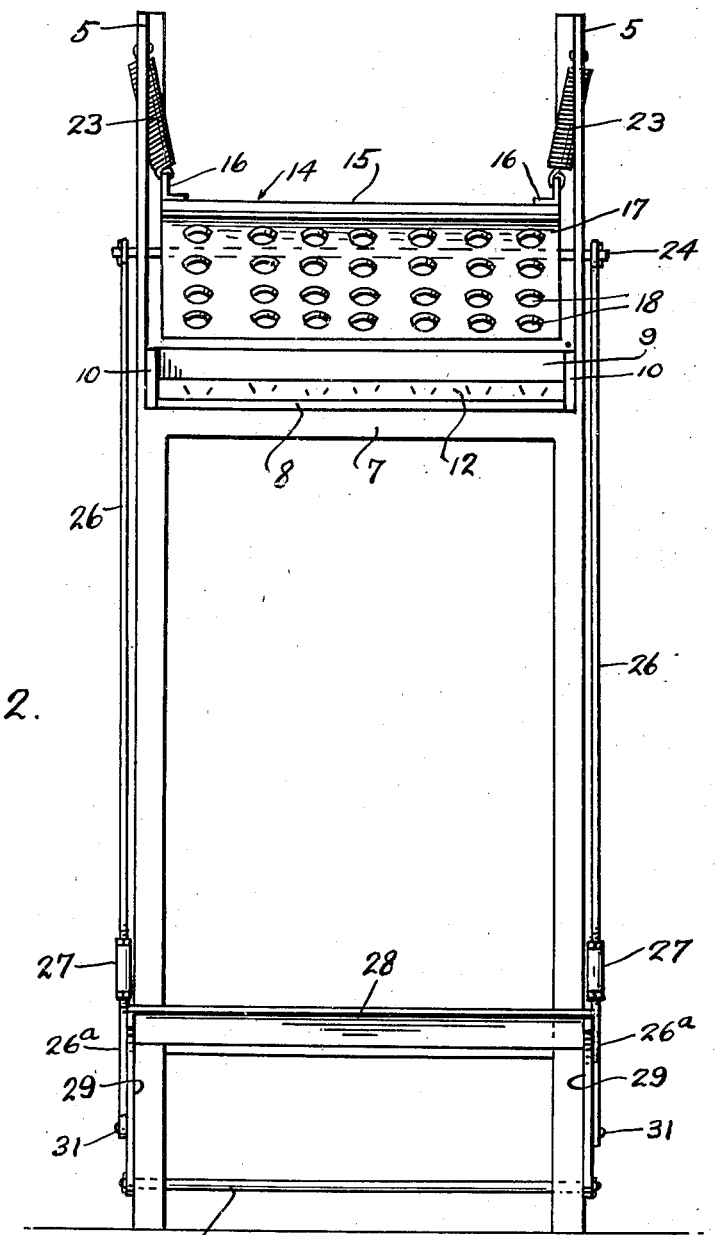
Figure 2 is a front elevational view thereof.

Referring to the drawings by reference numerals, it will be seen that in the preferred embodiment thereof the improved dough pressing machine comprises a skeleton frame structure consisting of corner posts 5 connected adjacent their lower ends through the medium of bars 6, and at a point spaced downwardly from the upper ends thereof, the corner posts 5 at the front and rear of the press are connected by angle bars 7.

The angle bars 7 support a bed or supporting platform 8 which has along the rear side, and two opposite sides thereof, upstanding wall members 9 and 10, respectively. The bottom member of the bed or platform 8 is preferably provided with a facing sheet 11 of metal or other suitable material.

The dough to be shaped may be placed directly on the cover sheet 11 of the bed 8, or placed in a pan, and in the present instance I have illustrated the use of the press when a pan such as a pan 12 is used, and which pan is shown as provided with a plurality of wells 13 in which the dough to be shaped is placed.

Further, the invention comprises a presser member indicated by the reference numeral 14. The presser member 14 comprises a flat board or body member 15 reinforced at its opposite side edges through the medium of angle bars 16.

Where a pan, such as for example a pan 12, is used for shaping the dough, the presser board 15 on the under side thereof is provided with a presser member 17 in the form of a plate having pressed therefrom or otherwise provided a plurality of individual presser elements 18 complemental to the wells 13.

At the rear end thereof there is provided for the presser member a pivot rod 19 that has its opposite ends extending through suitable openings provided therefor in the angle bars 16, and also through vertical slots 20 provided in the rear corner posts or legs 5, as will be clear from a study of Figures 1 and 4. The pivot rod 19 at its respective opposite ends is provided with suitable cotter pins 21.

Also secured to the rear ends of the brace members 16 of the presser board 15 are one end of coil springs 22 which at their upper ends are suitably anchored to the upper ends of the rear corner posts or legs 5.

Also, coil springs 23 are secured at one end to the angle members 16 at the forward ends of the latter, and at their upper ends the springs 23 are suitably anchored to the upper ends of the front corner posts or legs 5.

Extending between the angle bars 16 intermediate the ends of said angle bars and through openings in said angle bars is a transverse rod 24 to the opposite ends of which are suitably connected as at 25 rods 26.

Rods 26 have lower end sections 26a connected therewith through the medium of turnbuckles 27. Thus, it will be seen that the sections 26a may be adjusted relative to the main rods 26 if found desirable.

At the front of the pressing machine there is provided a pedal 28 secured to one end of cleats 29 which at their rear ends are pivoted to the rear supporting legs 5, as at 30. The lower ends of the rod sections 26a are pivoted to the cleats 29, as at 31.

From the above it will be apparent that the dough, either in pans or directly is first placed on the bed 8, after which the presser member 14 is caused to move downwardly, to cooperate with the bed 8 for pressing and shaping the dough, by placing the foot on the pedal 28 and pressing downwardly on the pedal; downward movement of the pedal being transmitted to the presser member 14, as is obvious.

It is thought that a clear understanding of the construction, utility, and advantages of a dough pressing machine of this character will be had without a more detailed description.

Having thus described the invention, what is claimed as new is:

1. In a machine for pressing dough or other plastic material, a supporting bed or platform, supporting legs for said platform having upper ends extending upwardly beyond said platform, a presser member disposed within the confines of the upper ends of said supporting legs, and positioned above said bed, spring devices suspending said presser member from the upper ends of said legs, two opposed legs above said bed being provided with slots, and a pivot rod for said presser member extending transversely of the latter adjacent one edge of the bed and having free ends working in said slots.

2. In a machine for pressing dough or other plastic material, a supporting bed or platform, supporting legs for said platform having upper ends extending upwardly beyond said platform, a presser member disposed within the confines of the upper ends of said supporting legs, and positioned above said bed, spring devices suspending said presser member from the upper ends of said legs, two opposed legs above said bed being provided with slots, a pivot rod for said presser member extending transversely of the latter adjacent one edge of the bed and having free ends working in said slots, a foot pedal having cleat members pivoted at one end to a pair of said legs adjacent the lower ends of said legs, and longitudinally adjustable rods connecting said presser member at opposite sides of the latter with the cleats of said pedal for transmitting movement of the pedal to said presser member whereby the latter is caused to move downwardly into cooperative pressing position relative to said bed.

3. In a pressing machine of the character described, the combination of a presser member having on the underside thereof a plurality of individual pressing elements and a support for said pressing member including suspension springs connected at one end to the presser member at the corners of the latter and a pair of opposed standards provided with slots, and a pivot pin extending transversely of the presser member adjacent one edge of the latter and having its respective opposite ends engaging in said slots.

4. In a pressing machine of the character described, a presser member and supporting means for said presser member including suspension springs normally urging the presser member upwardly, a pair of opposed posts, and inter-engaging means on said posts and said presser member at each of two opposite corners thereof respectively coacting to provide a vertically shiftable pivot connection between the presser member and said posts.

ESSEL G. YOUNG.